United States Patent

[11] 3,581,660

| [72] | Inventors | Sidney L. Rapoport;<br>Douglas F. Mitchell, both of New York, N.Y. |
|---|---|---|
| [21] | Appl. No. | 784,836 |
| [22] | Filed | Dec. 18, 1968 |
| [45] | Patented | June 1, 1971 |
| [73] | Assignee | Rapoport Printing Corporation<br>New York, N.Y. |

[54] LITHOGRAPHIC PRINTING PROCESS
22 Claims, 1 Drawing Fig.

[52] U.S. Cl. .................................................. 101/450, 96/31
[51] Int. Cl. ..................................................... B41m 1/18, G03f 5/24
[50] Field of Search ........................................ 101/450, 211; 96/116, 45, 31, 45.2; 95/1

[56] References Cited

UNITED STATES PATENTS

| 547,780 | 10/1895 | Gast | 96/116 |
|---|---|---|---|
| 640,469 | 1/1900 | Jacobson | 96/116 |
| 744,223 | 11/1903 | Ortmann | 96/116 |
| 809,157 | 1/1906 | Weyl | 96/116 |
| 871,234 | 11/1907 | McIntosh | 96/45 |
| 1,504,782 | 8/1924 | Powrie | 101/211X |
| 2,021,191 | 11/1935 | Marsh et al. | 96/45 |
| 2,060,640 | 11/1936 | Shaw | 96/45 |
| 2,119,041 | 5/1938 | Carman et al. | 101/211 |
| 3,178,997 | 4/1965 | Kelly | 96/45.2 |

OTHER REFERENCES

Lithographer 3 & 2, Navpers; 10452, Reprinted 1961 (Available Group 337 EMC) p. 237

*Primary Examiner*—William B. Penn
*Assistant Examiner*—E. M. Coven
*Attorney*—Mandeville and Schweitzer

ABSTRACT: A method for producing lithographic reproductions having outstanding tonal fidelity is disclosed. The new method includes the making of master and secondary printing plates from photographic images of the original copy and sequentially and in registry printing with each printing plate. Both printing plates are formed by photoengraving techniques from separate photographic negatives, each obtained by photographically exposing the original copy through a screen having an image disrupting surface pattern. The screen utilized in producing the master printing plate is a conventional square grid halftone screen, while that used in making the secondary negative has a fine irregular surface pattern.

|← 1/30 IN. →|  (30X)

Patented June 1, 1971
3,581,660
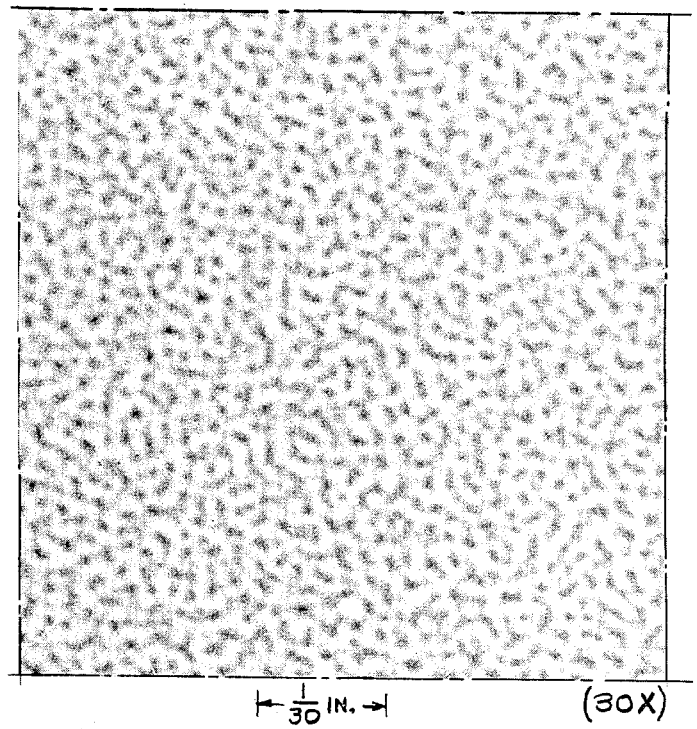
|←1/30 IN.→|  (30X)
INVENTORS
SIDNEY L. RAPOPORT
BY  DOUGLAS F. MITCHELL
Mandeville & Schweitzer
ATTORNEYS

LITHOGRAPHIC PRINTING PROCESS

BACKGROUND OF THE INVENTION

The invention relates to the photolithographic reproduction of original copy having gradations of tone values, such as photographs, paintings, and wash drawings. More specifically, the invention is concerned with a new reproduction method including a two-step printing process with separate photoengraved printing plates. The printing plates are produced from photographic negatives obtained by exposing the original copy through screen having different light disruptive patterns. The final print produced by the new method shows a startling improvement in tonal fidelity, particularly in dark areas, relative to conventional halftone reproductions.

The art of halftone reproduction has remained basically unchanged for a great many years, most improvements in the art being the result of developments in photographic techniques and equipment. The basic halftone process includes photographing the original copy, through a screen having a regular grid pattern of transparent areas defined by opaque lines. This screen, known in the art as a halftone screen, is typically a glass plate or a photographic transparency of a clear glass plate that is engraved with a square grid pattern. The engraved lines forming the square grid pattern are usually filled with ink or other opaque material to divide the surface of the glass plate into square transparent areas defined by opaque lines. The spacing of the opaque lines on the halftone screen is a major factor in determining the quality of the final reproduction. The line spacing chosen for a particular application can vary from approximately 50 lines per inch for low quality reproductions, such as those found in newspapers, to about 200 lines per inch for high quality reproductions such as those found in high quality magazines and books.

The photographic negative produced by photographically exposing the original copy through a square grid halftone screen is a pattern of dots. The individual dots comprising the dot pattern vary in size according to the light density of the grey tone they are to reproduce. In reproducing light areas of the original copy, the dots can be so small that they almost disappear. Dark grey tones of the original copy, i.e., those having a light density as measured by a light meter of between about 1.25 and 2.1 (which is pure black), are reproduced by dots that are relatively much larger and join together resulting in an almost continuous solid dark surface.

A halftone printing plate is then made from the halftone photographic negative by well known photoengraving techniques. The halftone printing plate is usually a copper plate etched in an acid bath to produce raised surfaces conforming to the dot pattern, although electric and powderless etching techniques have been used. Prints of the original copy are then obtained by offset printing with the halftone printing plate.

The halftone print resulting from the basic halftone process, although adequate for many applications, has inherent quality limitations. The quality of a halftone reproduction can be judged by its reproduction of the various tone gradations in the original copy as measured by light density. Grey tones extend from pure white, having a light density of 0.05 to pure black, having a light density of 2.1. It has been found through experience that no matter how fine a halftone screen is used, the basic halftone process does not reproduce grey tones darker than those having a light density greater than about 1.5, which is a relatively intermediate grey tone. As a result of this tonal characteristic of conventional halftone reproductions, all grey tones of the original copy that have a light density greater than 1.5, i.e., those between 1.5 and 2.1 are reproduced as a 1.5 density grey tone. Consequently, halftone reproductions are characteristically lacking of details in areas of the original copy having a light density darker than about 1.5.

SUMMARY OF THE INVENTION

The method of the invention includes the making of two printing plates from the original copy by photoengraving means. The two printing plates are substantially different, the first or master plate being produced from a standard halftone negative and the secondary plate from a negative made in accordance with specific aspects of the invention, including the use of a random pattern screen in place of the conventional square grid halftone screen. The final reproduction of the invention is obtained by printing with both printing plates in sequence and in registry.

The final prints of the invention are characterized by reproducing areas of the original copy that are darker in tone than the darkest tonal values found in conventional halftone prints. As a result of the extended tonal reproduction obtainable by the new method, the prints of the invention are much finer in shadow and dark area details than the usual halftone print and are suitable for very high quality reproduction applications.

The random pattern screen utilized in producing the second negative and printing plate can be a photographic transparency of a clear glass plate having a random pattern physically inscribed into its surface or the glass plate itself. Although many different random patterns may be used in accordance with the invention, it has been found that a fine grained or granular surface pattern is particularly advantageous. Preferably, a photographic screen of the invention is utilized in a contact photographic process to produce the second negative. Because of the random pattern of the secondary screen it does not conflict with and is compatible with the master screen regardless of angle or ruling.

In accordance with the invention, the secondary printing plate is produced by photographically exposing the original copy through the new random pattern screen. In making the secondary negative to be used in producing the secondary printing plate, a photographic surface is exposed to the original copy for a substantially longer time than the photographic surface utilized in producing the conventional halftone negative. The overexposure of the secondary photographic surface washes out areas of the original copy having light and middle grey tones and results in a photographic image of areas of the original copy that have a light density between about 1.25 and 2.1.

When final prints are prepared in accordance with the two-step printing method of the invention, the light and middle grey tones of the original copy are accurately reproduced by the conventional halftone printing step, without interference from the secondary printing step since the secondary photographic image and consequently, the printing plate derived therefrom is substantially void of these intermediate grey tones. Although the actual grey tones reproduced by the second printing plate are relatively light in grey tonal value, the reproduced tones are of areas in the original copy having a light density darker than about 1.25. The unexpected and startling tonal effects of the invention are obtained when the master halftone printing plate and the new secondary printing plate of the invention are printed in registry. The lithographic prints produced by the new method are characterized by extraordinary detail in areas of the reproduction corresponding to sections of the original copy having a light density darker than about 1.5.

DESCRIPTION OF THE DRAWING

The drawing is a photomicrograph of a secondary screen for use in the method of the invention enlarged 30 times to clearly show a preferred random, irregular, granular surface pattern.

DESCRIPTION OF PREFERRED EMBODIMENT

The two printing plates used in the method of the invention are produced by first photographically exposing the original copy through a patterned screen to form separate negatives.

Since both printing plates are made independently, it is immaterial which is made first. However, in order to simplify the description of the new process, reference to the conventional halftone printing plate and its manufacture will be arbitrarily prefaced by "master" while the new printing plate and the steps of its manufacture will be referred to as "second" or "secondary."

Most advantageously, the sheet of photographic film used in making the secondary printing plate is prefogged before exposure to the original copy in order to increase its speed and sensitivity. Typically, the prefogging step includes the exposure of the light sensitive surface of the film to a very dim white to blue light bulb of about 8 watts for a short period of time, usually about 1 to 2 seconds. It has been found that particularly good tonal gradations in the final print result when the secondary photographic film is prefogged prior to exposure to the original copy.

Both sheets of photographic film used to produce the negatives should be of high quality in order to maximize the outstanding tonal reproduction obtainable with the new method. Both films are exposed to the original copy through the respective screens under the same lighting conditions except for exposure time. The first film is exposed to the original copy for the conventional time of approximately 15 seconds through a fine square grid halftone screen, while the second photographic surface is exposed through the new screen for a substantially longer time.

In accordance with a specific aspect of the invention, the second exposure is about 5—7 times as long as the conventional halftone exposure, depending on the degree of selectivity required. The degree of selectivity is the amount of control that can be exerted over deep shadow reproductions so as to increase or decrease the detail visible to the naked eye in the final print. The overexposure of the second film produces a second negative that does not reproduce areas of the original copy that are of a light or middle grey tone. Consequently, the light and middle tones of the original copy are reproduced by the master halftone printing plate, while the dark tones are enhanced by the overprinting with the secondary printing plate.

The secondary photographic film reproduces the dark areas of the original copy in lighter grey tones than they actually are in the original. However, when the master and secondary exposures are combined in accordance with the printing steps of the invention, the dark areas of the original copy, usually those having a light density darker than 1.25, are reproduced in outstanding detail. Since the light and middle grey tones are washed out of the secondary negative by overexposure, these tones are faithfully reproduced in the final print by the master halftone printing plate. The final print of the invention, therefore, provides an accurate reproduction of the dark as well as light and middle grey tones of the original copy. It has been determined that various tonal effects such as softness and contrast in the final print may be obtained by controlling the varying second exposure time.

The screen interposed between the secondary film and the original copy during the secondary exposure step is made from a clear glass plate having an irregular surface pattern and can be in the form of a photographic transparency. The transparencies of the glass screen should be in contact with the photographic film during exposure to the original copy. Preferably, the surface pattern of the secondary screen is a fine irregular configuration having a grained appearance such as that shown in the drawing. The secondary screen used in making the illustrated screen has a rough pebbledlike surface with approximately 40,000 irregularities, or raised areas of irregular outline per square inch, in a random pattern. It has been found that coarse screens having less than about 22,500 irregularities per square inch are not particularly suited for use with the new method. It also has been determined that screens with more than about 62,500 irregularities per square inch, although usable with the method of the invention, do not result in any significant improvement in the tonal fidelity of the final print relative to prints produced with screens having 62,500 irregularities per square inch. However, the tonal characteristics of the final print improve as the fineness of the random pattern screen increases from about 22,500 irregularities per square inch to about 62,500 irregularities per square inch.

Although many different types of fine surface patterns on a glass plate may provide a suitable basis for a contact screen for use in the new method, an irregular pebbled surface such as that shown in the drawing is preferred. Pebbled glass screens of the type shown in the drawing may be made by sandblasting a glass plate to obtain the desired irregular surface. It should be noted that when a photographic transparency is utilized as the second screen in the new method, the irregular pattern can be provided by almost any irregular patterned surface, since the fineness, i.e., number of irregularities per square inch of the screen, can be varied by photographic enlargement or reduction.

In accordance with a specific aspect of the invention, a contact screen conforming to the illustrated screen can be made from a rough surfaced gelatin coated clear glass plating having approximately 40,000 irregularities per square inch, as follows. First a sheet of Kodak commercial Ortho film, 20×24, is prefogged. An exposure of the glass screen using a sheet of tinted white as copy is then made. This exposure is developed in a solution of Dektol until the required optical density is achieved. The screen should have a soft greyed structure that will reproduce with an overall smoothness in tone without a harsh grain.

Preferably, the square grid halftone screen used in making the master photographic negative of the original copy should be what is known in the art as a 200 line screen. A 200 line screen has 200 opaque lines per inch in each of two transverse directions, resulting in approximately 40,000 transparent squares per square inch. A halftone screen of this fineness is typically used for high quality work and can produce light and middle grey tones very accurately.

After exposure to the original copy, both photographic surfaces are developed into master and secondary negatives. Corresponding master and secondary printing plates are then made from these negatives by photoengraving techniques well known in the art. Preferably, the printing plates are produced by photoengraving techniques directly from the negatives rather than from positives. Both printing plates are then used to produce the prints of the invention by dual printing, sequentially and in registry on a single or two color offset printing press.

In making the secondary printing plate from the secondary negative by photoengraving techniques, it is preferred to use a plate material that can vary with length of exposure. A specific plate found advantageous in producing the secondary printing plate is known in the art as a "K" and is available from the 3M Company. The "K" plate, and, of course, others having similar characteristics, is very suitable for use in accordance with the invention because of its ability to gain in image with increased exposure.

The final prints produced by the two-step printing process of the invention show startling detail in dark areas of the reproduction where none appears to exist on a conventional halftone reproduction. It is preferred to print the master halftone first and overprint with the secondary printing plate, although satisfactory results have been obtained by reversing the printing order. Before overprinting with the secondary printing plate, the master halftone print appears to be black in dark areas of the original copy and is lacking in detail in these areas, since tones in the original copy having a light density between about 1.5 and 2.1 are reproduced as 1.5. When overprinted with the second printing plate, an amazing degree of detail in the black appearing areas of the master halftone print is visible to the eye. The tonal range of the normal halftone print is from a light density between about 0.05 and 1.5. The new method increases the tonal range of the final print to from 0.05 to 2.1, or a 33percent increase in the tonal scale, thereby reproducing dark tones of the original copy that are not discernible in conventional halftone prints.

In addition to the startling increase in shadow and dark tone detail provided by the new and improved method, the final prints of the invention exude a feeling of warmth and depth not characteristic of halftone prints. Although these characteristics are intangible and subjective, they are believed to be caused by an actual shrinkage of lines reproduced by the second printing operation without distortion relative to the width of the same line reproduced in the master print. In the final print, the relatively thin line of the overprint darkens the center portion of the same line printed by the first print, causing an illusion of depth. For example, a two point rule (one thirty-sixth inch) is reduced to one point in the secondary print and falls within the corresponding master image to create the illusion of depth.

The method of the invention permits the lithographer to substantially raise the quality of his product without incurring a large capital expenditure for new equipment or a significantly greater production cost. By employing the two-step printing method of the invention, reproduction of original copy can be made on existing equipment, of a quality heretofore obtainable, if at all, by very expensive techniques.

It should be understood that the specific form of the invention herein illustrated and described is intended to be representative only, as certain changes may be made therein without departing from the clear teachings of the disclosure. Accordingly, reference should be made to the following appended claims in determining the full scope of the invention.

We claim:

1. A method for the lithographic reproduction of original copy, comprising
   a. forming a master halftone printing plate from a master photographic image of said original copy,
   b. said master photographic image being formed by exposing a first photographic film surface to said original copy through a square grid halftone screen,
   c. forming a secondary printing plate from a secondary photographic image of said original copy,
   d. said secondary photographic image being made by overexposing, relative to the exposure of said first photographic film surface, a second photographic film surface to said original copy through a random pattern screen,
   e. printing a paper substrate with said master printing plate, and
   f. printing sad paper substrate with said secondary printing plate,
   g. the printing steps of paragraphs (e) and (f) being performed in registry to produce a single reproduction of said original copy.

2. The method of claim 1, further including the step of
   a. increasing the speed and sensitivity of said second photographic film before exposure to said original copy.

3. The method of claim 2, wherein
   a. the speed and sensitivity of said second photographic film is increased by exposure to light.

4. A method for the lithographic reproduction of original copy comprising
   a. exposing a first photographically sensitive surface to said original copy through a halftone screen for a first predetermined time interval,
   b. developing the exposed first photographically sensitive surface to produce a halftone negative,
   c. producing a halftone printing plate from said halftone negative,
   d. exposing a second photographically sensitive substrate to said original copy through a random pattern screen for a second predetermined time interval,
   e. said second predetermined time interval being longer than said first predetermined time interval,
   f. photographically developing the exposed second light sensitive substrate to produce a second negative,
   g. producing a second printing plate from said second negative,
   h. printing a paper substrate with said halftone printing plate, and
   i. printing said paper substrate with said second printing plate,
   j. said printing steps of paragraphs (h) and (i) being performed in registry to produce a single reproduction of said original copy.

5. The method of claim 4, wherein
   a. said paper substrate is first printed with said halftone printing plate.

6. The method of claim 4, wherein
   a. said random pattern screen is a photographic transparency having more than about 22,500 irregularly shaped areas per square inch.

7. The method of claim 6, wherein
   a. said random screen has about 40,000 irregularly shaped areas per square inch.

8. The method of claim 4, wherein
   a. said random pattern screen is in contact with said second photographically sensitive substrate during exposure to said original copy.

9. The method of claim 4, wherein
   a. said second printing plate is produced by photolithographic techniques directly from said second negative.

10. A method for the lithographic reproduction of predetermined visual subject matter comprising
    a. producing a master printing plate,
    b. said producing step including the exposure of a first photographic film to said visual subject matter through a first screen having a predetermined square grid pattern of transparent and opaque areas,
    c. producing a secondary printing plate,
    d. said producing step of paragraph (c) including the exposure of a second photographic film to said visual subject matter through a second screen having a random surface pattern
    e. said second photographic film being overexposed to said visual subject matter relative to said first photographic film,
    f. printing a paper substrate with said master printing plate, and
    g. printing said paper substrate with said secondary printing plate,
    h. the printing steps of paragraphs (f) and (g) being performed in registry thereby producing a single image.

11. In the method of reproducing original copy by the halftone process, which includes the step of printing a substrate with a master printing plate produced by photolithographic techniques from a first photographic image of said original copy taken through a halftone screen, the improvement comprising printing said substrate with a secondary printing plate produced by photolithographic techniques from a second photographic image of said original copy taken through a screen having a random surface pattern of irregular configurations, said second photographic image of said original copy being overexposed relative to said first photographic image of said original copy, both of said printing steps being performed in registry to produce a single printed reproduction of said original copy.

12. The improved method of claim 11 wherein
    a. said screen having a random surface pattern has more than approximately 22,500 irregular configurations per square inch.

13. The method of claim 1 wherein said second photographic film surface is exposed to said original copy for a greater time interval than said first photographic film surface.

14. The method of claim 4 further including the step of
    a. prefogging said second photographically sensitive surface prior to exposure to said original copy.

15. The method of claim 4 wherein
    a. said second predetermined time interval is about 5 to 7 times as long as said first predetermined time interval.

16. The method of claim 10 wherein a. the overexposure of said second photographic film, relative to said first photographic film includes the step of prefogging said second photographic film.

17. The method of claim 10 wherein
a. said first photographic film is exposed to said visual subject matter for a first predetermined time interval,
b. said second photographic film is exposed to said visual subject matter for a second predetermined time interval,
c. said second predetermined time interval is longer than said first predetermined time interval.

18. The process of claim 17 wherein
a. said second predetermined time interval is about 5 to 7 times as long as said first predetermined time interval.

19. The method of claim 10 wherein
a. said second screen has a fine irregular surface having a grained appearance.

20. A method for the lithographic reproduction of visual subject matter comprising
a. printing a paperlike substrate with a master printing plate,
b. said master printing plate being produced by photolithographic techniques from a first photographic image of said visual subject matter taken through a halftone screen,
c. printing said paper like substrate with a secondary printing plate,
d. said secondary printing plate being produced by photolithographic techniques from a second photographic image of said visual subject matter taken through a screen in the form of a photographic transparency having a random surface pattern of irregular configurations,
e. said second photographic image being overexposed to said visual subject matter, relative to said first photographic image,
f. both of the printing steps being performed in registry to produce a single reproduction of said visual subject matter.

21. The method of claim 20 wherein
a. said random surface pattern of the screen has approximately 40,000 irregular configurations per square inch.

22. An improved lithographic reproduction produced according to the improved method of claim 11.